United States Patent
Patton et al.

(10) Patent No.: US 10,456,686 B2
(45) Date of Patent: Oct. 29, 2019

(54) METHODS AND SYSTEMS FOR ADAPTIVE TUNING OF GAME EVENTS

(71) Applicant: Zynga Inc., San Francisco, CA (US)

(72) Inventors: Stan Patton, Eugene, OR (US); Jean Luo, Hewlett, NY (US); Jack Lim, Hayward, CA (US); Tim LeTourneau, Danville, CA (US); Alexi Chialtas, San Francisco, CA (US); Joseph Traverso, San Francisco, CA (US); Hao Chen, San Bruno, CA (US)

(73) Assignee: Zynga Inc., San Francisco, CA (US)

( * ) Notice: Subject to any disclaimer, the term of this patent is extended or adjusted under 35 U.S.C. 154(b) by 352 days.

(21) Appl. No.: 14/849,354

(22) Filed: Sep. 9, 2015

(65) Prior Publication Data

US 2015/0375120 A1    Dec. 31, 2015

Related U.S. Application Data

(63) Continuation-in-part of application No. 13/604,552, filed on Sep. 5, 2012, now Pat. No. 9,272,208.
(Continued)

(51) Int. Cl.
*A63F 13/67* (2014.01)
*A63F 13/79* (2014.01)
(Continued)

(52) U.S. Cl.
CPC .............. *A63F 13/67* (2014.09); *A63F 13/79* (2014.09); *A63F 13/798* (2014.09); *A63F 13/35* (2014.09); *A63F 13/69* (2014.09)

(58) Field of Classification Search
CPC ......... A63F 13/79; A63F 13/798; A63F 13/67
See application file for complete search history.

(56) References Cited

U.S. PATENT DOCUMENTS

| 4,015,846 A | 4/1977 | Runte et al. |
| 4,679,789 A | 7/1987 | Okada |

(Continued)

FOREIGN PATENT DOCUMENTS

WO    WO-2005061067 A1    7/2005

OTHER PUBLICATIONS

"U.S. Appl. No. 15/646,953, Response filed Jun. 26, 2018 to Non Final Office Action dated Jan. 26, 2018", 14 pgs.
(Continued)

*Primary Examiner* — William H McCulloch, Jr.
(74) *Attorney, Agent, or Firm* — Schwegman Lundberg & Woessner, P.A.

(57) ABSTRACT

A system, a machine-readable storage medium storing instructions, and a computer-implemented method are described herein for a System Tuner for defining an in-game event requiring accumulation of a pre-defined set of virtual objects in a virtual game (or online game) prior to termination of the in-game event. The System Tuner determines a head-start subset from the pre-defined set of virtual objects for a target player account based on a difference between a reference player skill level for the virtual game and a player skill level of the target player account. The System Tuner determines, based on the player skill level of the target player account and a pre-defined duration of the in-game event, a drop rate for virtual objects remaining in the pre-defined set of virtual objects. The System Tuner sends the head-start subset and the drop rate to a client device associated with the target player account.

10 Claims, 8 Drawing Sheets

Related U.S. Application Data

(60) Provisional application No. 62/048,362, filed on Sep. 10, 2014.

(51) Int. Cl.
*A63F 13/798* (2014.01)
*A63F 13/35* (2014.01)
*A63F 13/69* (2014.01)

(56) References Cited

U.S. PATENT DOCUMENTS

| | | | |
|---|---|---|---|
| 5,370,399 A | 12/1994 | Liverance | |
| 5,377,100 A | 12/1994 | Pope et al. | |
| 5,683,082 A | 11/1997 | Takemoto et al. | |
| 5,813,913 A | 9/1998 | Berner et al. | |
| 5,968,063 A | 10/1999 | Chu et al. | |
| 5,970,479 A | 10/1999 | Shepherd | |
| 5,971,850 A | 10/1999 | Linerance | |
| 6,106,395 A | 8/2000 | Begis | |
| 6,174,237 B1 | 1/2001 | Stephenson | |
| 6,190,370 B1 | 2/2001 | Tsui | |
| 6,213,873 B1 | 4/2001 | Gasper et al. | |
| 6,302,793 B1 | 10/2001 | Fertitta, III et al. | |
| 6,358,148 B1 | 3/2002 | Tanaka | |
| 6,375,570 B1 | 4/2002 | Poole | |
| 6,579,177 B2 | 6/2003 | Mraovic | |
| 6,648,760 B1 | 11/2003 | Nicastro | |
| 6,702,675 B2 | 3/2004 | Poole et al. | |
| 6,758,752 B1 | 7/2004 | Miyagawa | |
| 7,076,445 B1 | 7/2006 | Cartwright | |
| 7,094,147 B2 | 8/2006 | Nakata et al. | |
| 7,192,345 B2 | 3/2007 | Muir et al. | |
| 7,367,882 B2 | 5/2008 | Fukutome | |
| 7,425,175 B2 | 9/2008 | Nakano et al. | |
| 7,717,781 B2 | 5/2010 | Hattori et al. | |
| 7,818,399 B1 | 10/2010 | Ross, Jr. et al. | |
| 8,016,653 B2 | 9/2011 | Pendleton et al. | |
| 8,210,925 B2 | 7/2012 | Johnson | |
| 8,219,509 B2 | 7/2012 | Ansari et al. | |
| 8,303,416 B1 | 11/2012 | Thakkar et al. | |
| 8,401,710 B2 | 3/2013 | Budhraja et al. | |
| 8,439,759 B1 | 5/2013 | Mello et al. | |
| 8,475,274 B2 | 7/2013 | Jacob | |
| 8,496,531 B2 | 7/2013 | Youm | |
| 8,550,920 B1 | 10/2013 | Allen et al. | |
| 8,622,828 B1 | 1/2014 | Harrington | |
| 8,663,004 B1 | 3/2014 | Xu | |
| 8,668,581 B2* | 3/2014 | Arnone | G06F 21/552 463/29 |
| 8,734,243 B2 | 5/2014 | Harrington | |
| 8,764,561 B1 | 7/2014 | Lan et al. | |
| 8,944,908 B1 | 2/2015 | Wakeford et al. | |
| 9,039,535 B2 | 5/2015 | Boss et al. | |
| 9,101,834 B2* | 8/2015 | LeTourneau | A63F 13/60 |
| 9,104,834 B2 | 8/2015 | Bickford et al. | |
| 9,132,353 B2* | 9/2015 | Otomo | A63F 13/422 |
| 9,186,584 B2 | 11/2015 | Morrison et al. | |
| 9,205,338 B1 | 12/2015 | Wakeford et al. | |
| 9,266,026 B2 | 2/2016 | Jacob | |
| 9,272,208 B1* | 3/2016 | LeTourneau | A63F 13/30 |
| 9,415,305 B2 | 8/2016 | Cudak et al. | |
| 9,533,226 B2 | 1/2017 | Wakeford et al. | |
| 9,566,518 B2* | 2/2017 | Branson | A63F 13/537 |
| 9,573,063 B2* | 2/2017 | Branson | A63F 13/537 |
| 9,604,145 B2 | 3/2017 | Morrison et al. | |
| 9,649,568 B2 | 5/2017 | Wada | |
| 9,675,889 B2* | 6/2017 | Lai | A63F 13/67 |
| 9,737,815 B2* | 8/2017 | Dhawan | A63F 13/67 |
| 9,757,650 B2* | 9/2017 | Mehra | A63F 13/822 |
| 2003/0100369 A1 | 5/2003 | Gatto et al. | |
| 2003/0114219 A1 | 6/2003 | McClintic | |
| 2003/0153373 A1 | 8/2003 | Squibbs | |
| 2003/0224858 A1 | 12/2003 | Yoseloff et al. | |
| 2004/0018878 A1 | 1/2004 | Silverman et al. | |
| 2004/0152505 A1 | 8/2004 | Herrmann et al. | |
| 2005/0043075 A1 | 2/2005 | Lin et al. | |
| 2005/0202861 A1 | 9/2005 | Dougherty et al. | |
| 2005/0266908 A1 | 12/2005 | Hattori et al. | |
| 2005/0277456 A1 | 12/2005 | Mizuguchi et al. | |
| 2006/0003841 A1 | 1/2006 | Kobayashi et al. | |
| 2006/0121991 A1 | 6/2006 | Borinik et al. | |
| 2006/0181535 A1 | 8/2006 | Watt et al. | |
| 2006/0258415 A1 | 11/2006 | Nakano et al. | |
| 2006/0287046 A1 | 12/2006 | Walker et al. | |
| 2007/0026934 A1 | 2/2007 | Herbrich et al. | |
| 2007/0054717 A1 | 3/2007 | Youm et al. | |
| 2007/0060338 A1* | 3/2007 | Kefaloukos | A63F 13/005 463/30 |
| 2007/0066403 A1 | 3/2007 | Conkwright | |
| 2008/0161079 A1 | 7/2008 | Wei | |
| 2008/0227525 A1 | 9/2008 | Kelly et al. | |
| 2008/0266250 A1 | 10/2008 | Jacob | |
| 2009/0131152 A1 | 5/2009 | Busse | |
| 2009/0149246 A1* | 6/2009 | Opaluch | A63F 13/63 463/29 |
| 2009/0209323 A1 | 8/2009 | Ansari et al. | |
| 2009/0215526 A1 | 8/2009 | Matsumoto et al. | |
| 2010/0279762 A1 | 11/2010 | Sohn et al. | |
| 2010/0304839 A1 | 12/2010 | Johnson | |
| 2011/0086702 A1* | 4/2011 | Borst | A63F 13/533 463/30 |
| 2011/0165939 A1* | 7/2011 | Borst | A63F 13/69 463/29 |
| 2011/0281639 A1* | 11/2011 | Porat | A63F 13/798 463/23 |
| 2012/0010734 A1 | 1/2012 | Youm | |
| 2013/0072287 A1 | 3/2013 | Okuaki et al. | |
| 2013/0225260 A1 | 8/2013 | Cudak et al. | |
| 2013/0311951 A1 | 11/2013 | Jacob | |
| 2014/0066176 A1* | 3/2014 | LeTourneau | A63F 13/60 463/23 |
| 2014/0274258 A1 | 9/2014 | Hartmann et al. | |
| 2014/0295925 A1 | 10/2014 | Gladwell et al. | |
| 2015/0209672 A1* | 7/2015 | Otomo | A63F 13/537 463/31 |
| 2015/0246286 A1* | 9/2015 | Branson | A63F 13/537 463/31 |
| 2015/0352436 A1* | 12/2015 | Pieron | A63F 13/12 463/25 |
| 2015/0375120 A1* | 12/2015 | Lim | A63F 13/69 463/23 |
| 2016/0067601 A1* | 3/2016 | Mehra | A63F 13/822 463/11 |
| 2016/0067610 A1* | 3/2016 | Ware | A63F 13/67 463/23 |
| 2016/0067611 A1* | 3/2016 | Ware | A63F 13/67 463/29 |
| 2016/0067612 A1* | 3/2016 | Ntoulas | A63F 13/67 463/29 |
| 2016/0067613 A1* | 3/2016 | Ntoulas | A63F 13/67 463/29 |
| 2016/0067615 A1* | 3/2016 | Lai | A63F 13/67 463/23 |
| 2016/0082354 A1 | 3/2016 | Wakeford et al. | |
| 2016/0110962 A1 | 4/2016 | Arnone et al. | |
| 2016/0117890 A1* | 4/2016 | Arnone | G07F 17/3295 463/25 |
| 2016/0256775 A1 | 9/2016 | Gustafson et al. | |
| 2017/0246540 A1 | 8/2017 | Lai et al. | |
| 2017/0259178 A1* | 9/2017 | Aghdaie | A63F 13/73 |
| 2017/0304722 A1 | 10/2017 | Mehra et al. | |
| 2017/0312636 A1 | 11/2017 | Dhawan et al. | |

OTHER PUBLICATIONS

"U.S. Appl. No. 15/593,807, Examiner Interview Summary dated Jul. 3, 2018", 2 pgs.
"U.S. Appl. No. 15/652,800, Examiner Interview Summary dated Jul. 3, 2018", 2 pgs.
"U.S. Appl. No. 15/593,807, First Action Interview—Office Action Summary dated Jul. 10, 2018", 3 pgs.

(56) References Cited

OTHER PUBLICATIONS

"U.S. Appl. No. 15/652,800, First Action Interview—Office Action Summary dated Jul. 13, 2018", 3 pgs.
"U.S. Appl. No. 14/569,534, Response filed Jul. 20, 2018 to Final Office Action dated Apr. 20, 2018", 13 pgs.
"U.S. Appl. No. 13/604,552, Final Office Action dated Apr. 8, 2015", 8 pgs.
"U.S. Appl. No. 13/604,552, Non Final Office Action dated Jul. 27, 2015", 8 pgs.
"U.S. Appl. No. 13/604,552, Non Final Office Action dated Oct. 31, 2014", 8 pgs.
"U.S. Appl. No. 13/604,552, Response filed Jan. 30, 2015 to Non-Final Office Action dated Oct. 31, 2014", 10 pgs.
"U.S. Appl. No. 13/604,552, Response filed Jul. 1, 2015 to Final Office Action dated Apr. 8, 2015", 10 pgs.
"U.S. Appl. No. 14/018,998, Non Final Office Action dated Oct. 31, 2014", 8 pgs.
"U.S. Appl. No. 14/018,998, Notice of Allowance dated Apr. 8, 2015", 8 pgs.
"U.S. Appl. No. 14/018,998, Response filed Jan. 30, 2015 to Non-Final Office Action dated Oct. 31, 2014", 10 pgs.
"U.S. Appl. No. 14/569,534, Final Office Action dated Apr. 20, 2018", 9 pgs.
"U.S. Appl. No. 14/849,291, Non Final Office Action dated Apr. 20, 2018", 14 pgs.
"U.S. Appl. No. 14/849,291, Response filed Mar. 6, 2018 to Final Office Action dated Oct. 6, 2017", 11 pgs.
"U.S. Appl. No. 14/849,341, Final Office Action dated Mar. 7, 2018", 15 pgs.
"U.S. Appl. No. 15/593,807, First Action Interview—Pre-Interview Communication dated Mar. 16, 2018", 4 pgs.
"U.S. Appl. No. 15/652,800, First Action Interview—Pre-Interview Communication dated Apr. 10, 2018", 4 pgs.
"U.S. Appl. No. 14/546,865, Amendment Under 37 C.F.R. 1.312 filed Mar. 1, 2017", 9 pgs.
"U.S. Appl. No. 14/546,865, Corrected Notice of Allowance dated Mar. 3, 2017", 4 pgs.
"U.S. Appl. No. 14/546,865, Notice of Allowance dated Feb. 7, 2017", 5 pgs.
"U.S. Appl. No. 14/546,865, PTO Response to Rule 312 Communication dated Mar. 10, 2017", 2 pgs.
"U.S. Appl. No. 14/569,534, Non Final Office Action dated Jun. 23, 2017", 9 pgs.
"U.S. Appl. No. 14/572,203, Examiner Interview Summary dated Mar. 10, 2017", 4 pgs.
"U.S. Appl. No. 14/572,203, Notice of Allowance dated Apr. 21, 2017", 12 pgs.
"U.S. Appl. No. 14/572,203, Response filed Mar. 3, 2017 to Non Final Office Action dated Dec. 30, 2016", 10 pgs.
"U.S. Appl. No. 14/601,807, First Action Interview—Office Action Summary dated Mar. 6, 2017", 3 pgs.
"U.S. Appl. No. 14/601,807, Notice of Allowance dated Jun. 7, 2017", 5 pgs.
"U.S. Appl. No. 14/601,807, Response filed Apr. 14, 2017 to Non Final Office Action dated Mar. 6, 2017", 9 pgs.
"U.S. Appl. No. 14/849,291, Response filed May 30, 2017 to Non Final Office Action dated Dec. 30, 2016", 11 pgs.
"U.S. Appl. No. 14/849,341, Non Final Office Action dated Jul. 6, 2017", 14 pgs.
"U.S. Appl. No. 15/646,953, Preliminary Amendment filed Jul. 12, 2017", 8 pgs.
"U.S. Appl. No. 15/593,807, Preliminary Amendment filed May 15, 2017", 8 pgs.
"U.S. Appl. No. 13/604,552, Examiner Interview Summary dated Oct. 16, 2015", 3 pgs.
"U.S. Appl. No. 13/604,552, Notice of Allowance dated Nov. 20, 2015", 5 pgs.
"U.S. Appl. No. 13/604,552, Response filed Oct. 14, 2015 to Final Office Action dated Jul. 27, 2015", 11 pgs.
"U.S. Appl. No. 14/572,203, Examiner Interview Summary dated Apr. 7, 2016", 19 pgs.
"U.S. Appl. No. 14/572,203, First Action Interview dated Feb. 26, 2016", 15 pgs.
"U.S. Appl. No. 14/572,203, First Action Interview dated Apr. 7, 2016", 20 pgs.
"U.S. Appl. No. 14/849,291, Non Final Office Action dated Feb. 12, 2016", 9 pgs.
"U.S. Appl. No. 14/849,291, Response filed May 10, 2016 to Non Final Office Action dated Feb. 12, 2016", 14 pgs.
"U.S. Appl. No. 14/569,534, Response filed Dec. 22, 2017 to Non Final Office Action dated Jun. 23, 2017", 14 pgs.
"U.S. Appl. No. 14/849,291, Examiner Interview Summary dated Nov. 20, 2017", 3 pgs.
"U.S. Appl. No. 14/849,341, Response filed Dec. 6, 2017 to Non Final Office Action dated Jul. 6, 2017", 11 pgs.
"U.S. Appl. No. 15/646,953, Non Final Office Action dated Jan. 26, 2018", 13 pgs.
"U.S. Appl. No. 14/546,865, Examiner Interview Summary dated Dec. 21, 2016", 3 pgs.
"U.S. Appl. No. 14/546,865, Non Final Office Action dated Sep. 15, 2016", 8 pgs.
"U.S. Appl. No. 14/546,865, Response filed Dec. 14, 2016 to Non Final Office Action dated Sep. 15, 2016", 12 pgs.
"U.S. Appl. No. 14/572,203, Examiner Interview Summary dated Jun. 29, 2016", 3 pgs.
"U.S. Appl. No. 14/572,203, Final Office Action dated Sep. 13, 2016", 13 pgs.
"U.S. Appl. No. 14/572,203, Non Final Office Action dated Dec. 30, 2016", 12 pgs.
"U.S. Appl. No. 14/572,203, Response filed Dec. 5, 2016 to Final Office Action dated Sep. 13, 2016", 11 pgs.
"U.S. Appl. No. 14/572,203, Response filed Jun. 7, 2016 to First Action Interview dated Apr. 7, 2016", 16 pgs.
"U.S. Appl. No. 14/601,807, First Action Interview—Pre-Interview Communication dated Nov. 1, 2016", 4 pgs.
"U.S. Appl. No. 14/601,807, Response filed Dec. 15, 2016 to First Action Interview—Pre-Interview Communication dated Nov. 1, 2016", 9 pgs.
"U.S. Appl. No. 14/849,291, Non Final Office Action dated Dec. 30, 2016", 9 pgs.
"U.S. Appl. No. 14/849,341, Response Filed Aug. 7, 2018 to Final Office Action dated Mar. 7, 2018", 12 pgs.
"U.S. Appl. No. 14/569,534, Non Final Office Action dated Aug. 28, 2018", 23 pgs.
"U.S. Appl. No. 15/593,807, Response file Sep. 10, 2018 to First Action Interview dated Jul. 10, 2018", 11 pgs.
"U.S. Appl. No. 14/849,341, Non Final Office Action dated Sep. 11, 2018", 12 pgs.
"U.S. Appl. No. 14/569,534, Examiner Interview Summary dated Dec. 13, 2018", 3 pgs.
"U.S. Appl. No. 14/569,534, Response filed Nov. 28, 2018 to Non Final Office Action dated Nov. 28, 2018", 16 pgs.
"U.S. Appl. No. 14/849,291, Final Office Action dated Oct. 22, 2018", 15 pgs.
"U.S. Appl. No. 14/849,291, Response filed Jan. 22, 2019 to Final Office Action dated Oct. 22, 2018", 12 pgs.
"U.S. Appl. No. 14/849,291, Response filed Sep. 20, 2018 to Non Final Office Actio dated Apr. 20, 2018", 11 pgs.
"U.S. Appl. No. 15/593,807, Final Office Action dated Dec. 11, 2018", 6 pgs.
"U.S. Appl. No. 15/593,807, Response filed Feb. 8, 2019 to Final Office Action dated Dec. 11, 2018", 11 pgs.
"U.S. Appl. No. 15/646,953, Final Office Action dated Nov. 19, 2018", 22 pgs.
"U.S. Appl. No. 15/652,800, Notice of Allowance dated Dec. 28, 2018", 6 pgs.
"U.S. Appl. No. 15/652,800, Response filed NOv. 13, 2018 to First Action Interview—Office Action Summary dated Jul. 13, 2018", 14 pgs.
"U.S. Appl. No. 14/569,534, Notice of Allowance dated Mar. 27, 2019", 14 pgs.

(56) References Cited

OTHER PUBLICATIONS

"U.S. Appl. No. 14/849,291, Non Final Office Action dated Mar. 22, 2019", 15 pgs.
"U.S. Appl. No. 14/849,341, Final Office Action dated Apr. 19, 2019", 12 pgs.
"U.S. Appl. No. 15/593,807, Notice of Allowance dated Feb. 26, 2019", 5 pgs.
"U.S. Appl. No. 15/652,800, Corrected Notice of Allowability dated Mar. 28, 2019", 2 pgs.
"U.S. Appl. No. 15/652,800, Corrected Notice of Allowability dated May 13, 2019", 3 pgs.

* cited by examiner

METHODS AND SYSTEMS FOR ADAPTIVE TUNING OF GAME EVENTS

CROSS-REFERENCE TO RELATED APPLICATIONS

This application claims the benefit of priority to U.S. Provisional Patent Application entitled "Systems and Methods for Inter-level and Intra-Level Tuning," Ser. No. 62/048,362, filed Sep. 10, 2014, which is hereby incorporated herein by reference in its entirety.

This application is a continuation-in-part of U.S. patent application entitled "Methods and Systems for Generating Tailored Game Challenges," Ser. No. 13/604,552, filed Sep. 5, 2012, which is hereby incorporated herein by reference in its entirety.

TECHNICAL FIELD

The present disclosure generally relates to games and applications in general and, in particular embodiments, to customizing user experiences within online virtual games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DETAILED DESCRIPTION

Figure 1:
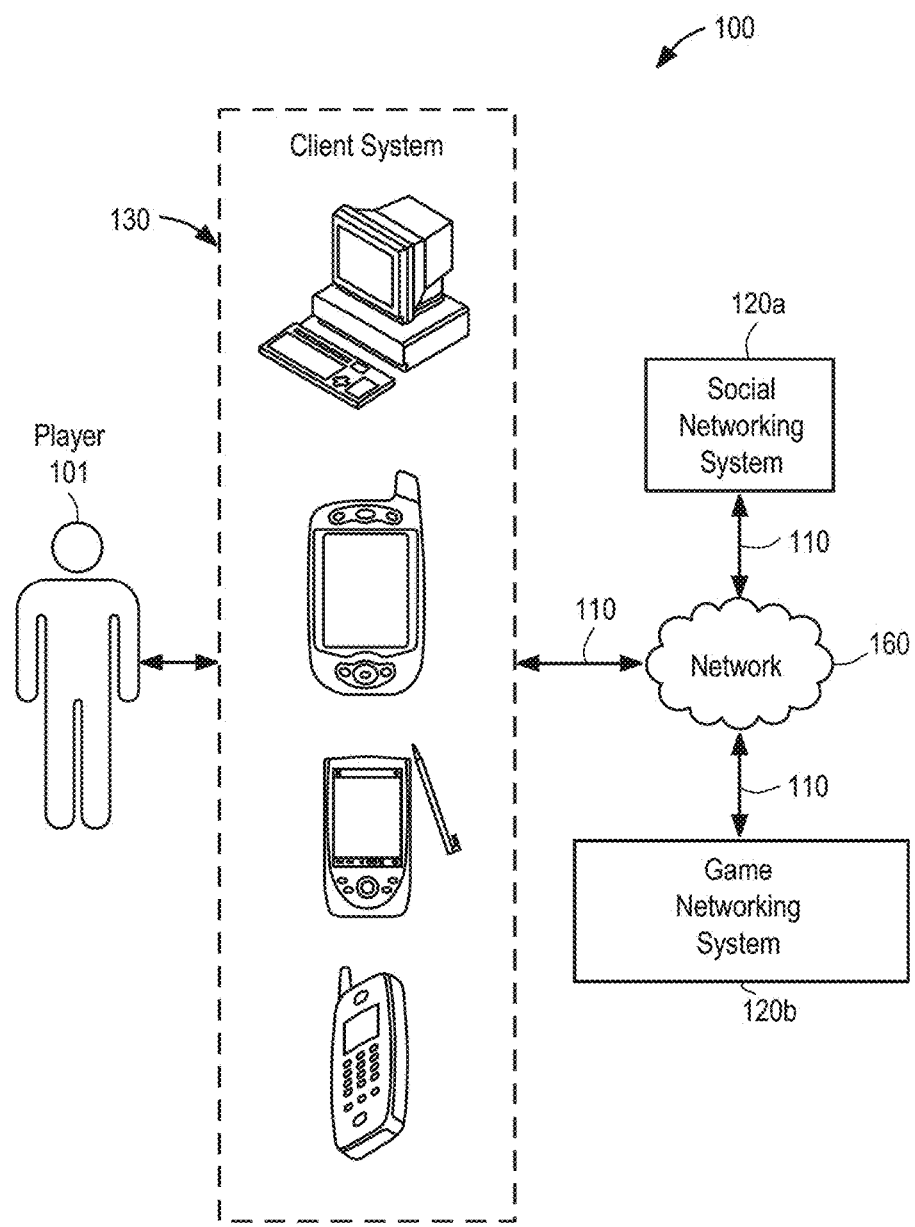
FIG. 1 is a schematic diagram showing an example of a system, according to some example embodiments.

Various embodiments disclosed herein are directed to a System Tuner that defines a tailored game challenge, such as an in-game event. An in-game event is a game challenge customized for a particular target player account that occurs within a virtual gaming environment. The in-game event requires completion of one or more inter-related and pre-defined game moves (or tasks) prior to a set expiration of the in-game event. Upon completion of the in-game event, the System Tuner provides a reward to the target player account.

In various embodiments, the System Tuner requires accumulation of a pre-defined set of virtual objects in a virtual game (or online game) prior to termination of the in-game event. The System Tuner determines a player-specific accumulation parameter(s), such as a head-start subset from the pre-defined set of virtual objects for a target player account based on a comparison between a reference gameplay metric for the virtual game and a corresponding gameplay metric for the target player account. System Tuner causes presentation on a client device associated with the target player account of the virtual game in accordance with the one or more player-specific accumulation parameters.

Various player-specific accumulation parameters include one or more of the following: a head-start subset from the pre-defined set of virtual objects and a drop rate(s) for each type of virtual object in the pre-defined set of virtual objects. The game play metric for the target player account comprises a player skill level of the target player account and/or a rate of progress through the virtual game (or in-game event) of the target player account and/or a level of engagement of the target player account with the virtual account. The level of engagement comprises a measure of how much (or how often) the target player account is engaged in game play in the virtual game. The reference game play metric comprises a skill level of a reference player (such as a highest skill level in the virtual game, a median skill level in the virtual game, etc.).

The System Tuner determines, based on the player skill level of the target player account and a pre-defined duration of the in-game event, a drop rate for virtual objects remaining in the pre-defined set of virtual objects. The System Tuner sends the head-start subset and the drop rate to a client device associated with the target player account.

The in-game event is defined for a specific amount of time. The in-game event requires that a player acquire each virtual object from a pre-defined set of virtual objects prior to termination of the in-game event. In some embodiments, the in-game event also requires the player to complete one or more tasks prior to termination of the in-game event. In some embodiments, a task may require the player to combine one or more acquired virtual objects to create a composite virtual object during the in-game event. In one embodiment, the in-game event requires the target player account to accumulate various virtual objects representative of different types of party supplies and to send out invitations to a specific number of social network friends.

In some embodiments, the specific amount of time allowed for the in-game event is based on chronological time as opposed to the amount of time the target player account plays the game. That is, the in-game event can be scheduled to last for a two week period regardless of how often the target player account accesses the game during the two week period or how much the target player account plays the game during the two week period. It is further understood that an in-game event can be directed to acquiring various types of virtual objects and creating and/or generating various types of composite objects germane to a respective virtual game.

Prior to initiating the in-game event for the target player account, the System Tuner identifies a reference player account with a highest player skill level (PSL) in the game. The System Tuner determines a reference rate of progression towards completing the in-game event—with respect to the in-game event's pre-defined termination—based on the reference player account's PSL. The System Tuner compares the current PSL of the target player account and the reference player account's PSL. Since the reference player account's PSL is the highest PSL for the game, the current player skill level (PSL) of the target player account will inevitably be less than the reference player account's PSL. As such, it is predictable that the target player account will most likely not progress through the in-game event in accordance with the reference rate of progression that is based on the reference player account's PSL.

To account for this discrepancy between the target player account's predicted progress through the in-game event and the reference rate of progression, the System Tuner determines a head-start subset from the pre-defined set of virtual objects to be granted to the target player account upon initiation of the in-game event. It is understood that the greater the difference between the PSL of the target player account and the reference rate of progression, the larger the head-start subset. The smaller the difference between the PSL of the target player account and the reference rate of progression, the smaller the head-start subset.

The System Tuner determines a drop-rate for each type of virtual object in the pre-defined set of virtual objects. A drop-rate for a respective type of virtual object comprises a frequency during the in-game event at which the respective virtual object remaining in the pre-defined set of virtual objects becomes available in the virtual game for acquisition by the target player account. A reference drop-rate is based on the reference rate of progression and the reference player account's PSL. That is, the reference drop-rate indicates a frequency at which a respective type of virtual object becomes available for acquisition in order for the reference player account to progress towards completion of the in-game event according to the reference rate of progression.

In some embodiments, a difference between the drop-rate and the reference drop-rate is in proportion to a difference between the PSL of the target player account and the reference player account's PSL. The greater a difference detected by the System Tuner between the PSL of the target player account and the reference player account's PSL, the System Tuner proportionally increases the drop-rate such that a frequency of appearance in the virtual game during the in-game event of a particular type of virtual object is greater than the reference drop-rate. The smaller a difference detected by the System Tuner between the PSL of the target player account and the reference player account's PSL, the System Tuner proportionally decreases the drop-rate such that that a frequency of appearance in the virtual game during the in-game event of a particular type of virtual object is substantially similar to the reference drop-rate. It is understood that each type of virtual object may have its own respective drop-rate.

The System Tuner continually receives game data from the client device associated with the target player account during the in-game event. Based on the game data, the System Tuner determines a current progress of the target player account towards completion of the in-game event in comparison to the reference rate of progression. For example, the System Tuner receives game data indicative of a total amount of the pre-defined set of virtual objects have been acquired by the target account player. This includes both the head-start subset as well as individual virtual objects acquired by the target player account as a result of one or more game moves performed during the in-game event. Based on the total amount of the virtual objects and a remaining duration of the in-game event, the System Tuner adjusts a drop-rate for one or more of the types of virtual objects in the pre-defined set of virtual objects.

For example, the System Tuner detects the current status of the target player account with respect to completing the in-game event based on the total amount of the virtual objects and the remaining amount of time left in the in-game event. The System Tuner compares the current status of the target player account with the reference rate of progression. The System Tuner determines that the target player account is not in alignment with the reference rate of progression despite having been granted the head-start subset when the in-game event began. In response, the System Tuner increases the drop-rate of one or more types of the virtual objects such that appearance of each respective type of virtual object during the in-game event is more frequent than as initially calibrated. The System Tuner sends an updated drop-rate(s) to the client device. It is understood that, in some embodiments, a drop-rate(s) can be decreased as well based on the current status of the target player account with respect to completing the in-game event.

In various embodiments, as described in U.S. patent application Ser. No. 13/604,552, a relationship graph is associated with the in-game event that represents data or logic that specifies relationships between different types of virtual objects in the in-game event's pre-defined set of virtual objects. For example, the relationship graph may specify a composite relationship between Apple and Apple Pie. A composite relationship may indicate that one type of virtual object (e.g., Apple Pie) is composed of another type of virtual object (e.g., Apples). Composite relationships may be useful in defining recipes that require one or more types of virtual objects. Additionally or alternatively, the relationship graph specifies a production relationship. A production relationship specifies that one type of virtual object (e.g., Apple Tree) produces another type of virtual object (e.g., Apples). Production relationships may be useful in determining whether a player has the ability (e.g., owns apple trees on the game board) to fulfill a requirement (e.g., grow apples) of the in-game event.

In various embodiments, the System Tuner calculates a player skill level for a player account based at least on a plurality of game moves in a game level(s) completed by the player. The System Tuner modifies at least one attribute of a next game level based on the player skill level prior to game play of the player in the next game level. The System Tuner detects game play of the player in the next game level. The System Tuner identifies a difference between a current rate of progression of the player through the next game level and a reference rate of progression for that game level. The System Tuner triggers the modified attribute of the next game level according to an extent of the difference between the current rate of progression and the reference rate of progression. By triggering the modified attribute, the System Tuner manipulates a level of difficulty experienced by the player account in the next game level currently played by the player account in order to assure that the player progresses through that game level according to the reference rate of progression.

In various embodiments, the System Tuner monitors activities of a player account within a game in order to continuously calculate and update the player account's PSL as the player account progresses between levels of the game. For example, the System Tuner updates the PSL once the player account completes a first game level and before the player account initiates game player in a subsequent second game level. In another example, the System Tuner updates the PSL as it receives gaming input from the player account. A game level allows the player a finite number of game moves in order to complete the game level—or a set of tasks to be completed in an in-game event that occurs within the game level. A game move can be an action performed by the player account. While the player account is playing the game level, the System Tuner compares the player account's progress in the game level against a reference rate of progress for that game level.

It is understood that various embodiments include the generation of one or more modules that comprise source code that, when compiled by a computing device(s), creates object code that causes the computing device(s) to perform one or more operations described herein. In other embodiments, any of the modules comprise object code that causes the computing device(s) to perform various operations described herein. In some embodiments, each module(s) can be permanently configured circuitry, such as ASICs, etc.

Other embodiments include the generation of one or more modules that comprise source code that, when compiled by a client computing device(s), creates object code that causes the client computing device(s) to perform one or more operations described herein in communication with a server computing devices(s). In other embodiments, any of the modules comprise object code that causes the client computing device(s) to perform various operations described herein in communication with the server computing devices(s).

Other embodiments include the generation of one or more modules that comprise source code that, when compiled by a server computing device(s), creates object code that causes the server computing device(s) to perform one or more operations described herein in communication with one or more client computing devices. In other embodiments, any of the modules comprise object code that causes the server computing device(s) to perform various operations described herein in communication with the one or more client computing devices.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b* (i.e. online gaming system), which includes a Notification Generator 150 that performs operations according to embodiments as described herein. The game networking system 120*b* can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Storing Game-Related Data

A database may store any data relating to game play within a game networking system 120*b*. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120*b* may determine the player's friend preferences based on player attributes that the player's first-degree friends have in common, and may store these player attributes as friend preferences in the player profile. Furthermore, the game networking system 120*b* may determine reputation-related information for the player based on user-generated content (UGC) from the player or the player's N[th] degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120b may determine the player's likelihood to lead value based on information from other players that interact with this player. For example, the game networking system 120b may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120b may also determine the player's likelihood to lead value based on information about the player's interactions with others and the outcome of these interactions. For example, the game networking system 120b may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120b may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
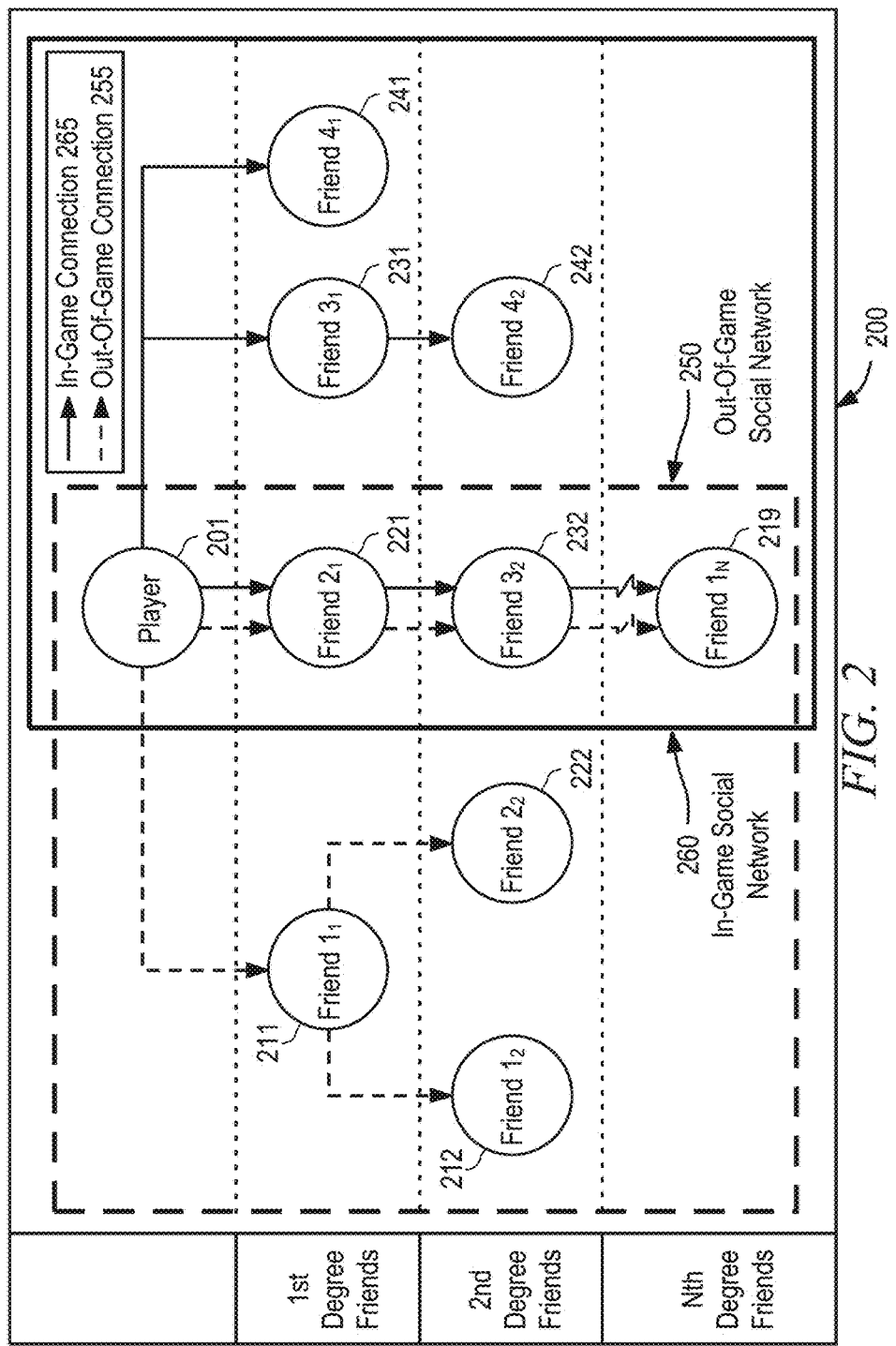
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
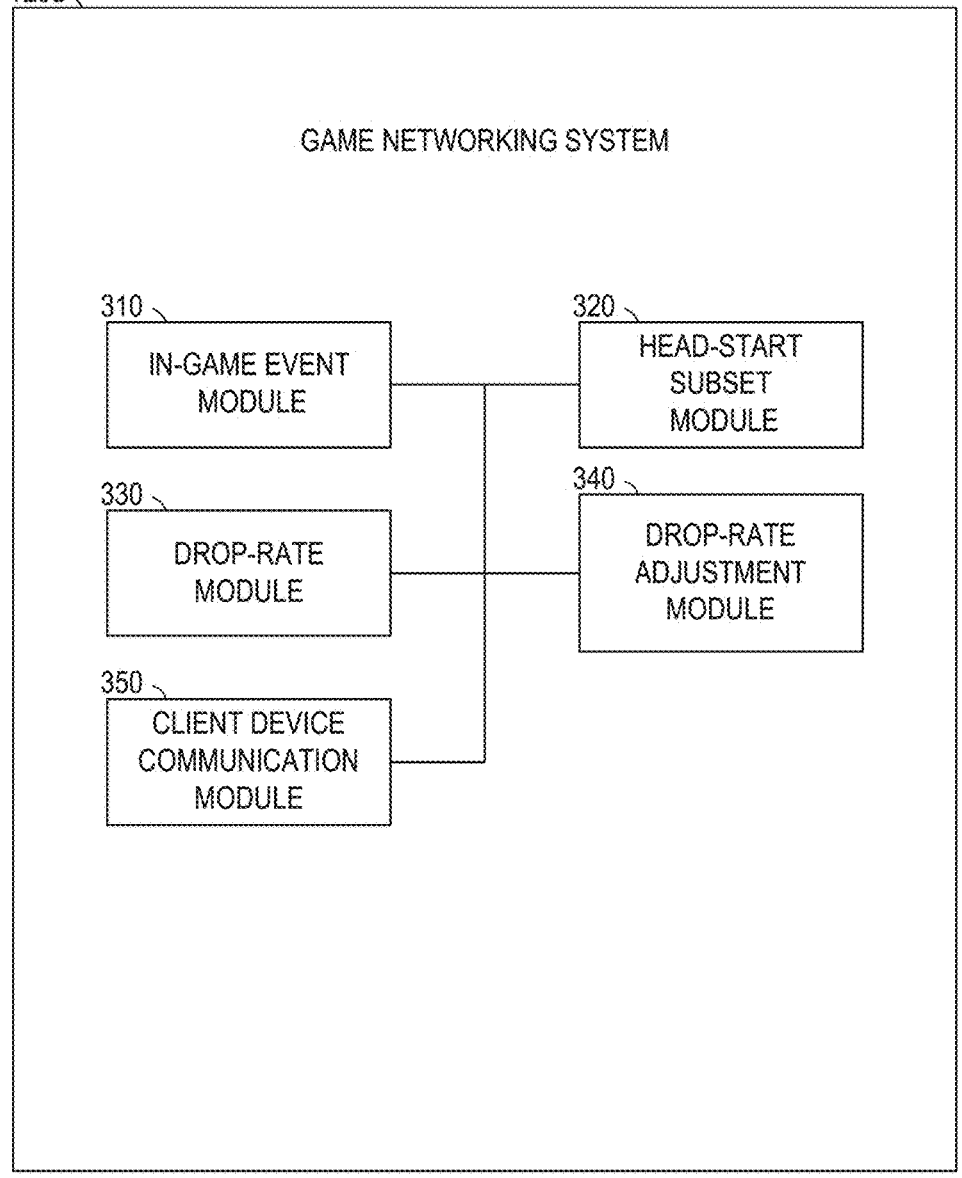
FIG. 3 is a block diagram illustrating components of a computing device, according to some example embodiments.

FIG. 3 is a block diagram illustrating components of a game networking system, according to some example embodiments. The game networking system 120*b* includes a System Tuner, which includes at least an in-game event module 310, a head-start subset 320, a drop rate module 330, a drop rate adjustment module 340 and client device communication module 350.

In various example embodiments, the in-game event module 310, is a hardware-implemented module that controls, manages and stores information related to the generation and initiation of an in-game event with respect to a client device associated with a target player account (such as Player 201).

In various example embodiments, the head-start subset module 320 is a hardware-implemented module that controls, manages and stores information related to determining a head-start subset for a target player account and sending the head-start subset to a client device associated with a target player account via the client device communication module 350.

In various example embodiments, the drop-rate module 330, is a hardware-implemented module that controls, manages and stores information related to calculating a drop-rate for each type of a virtual object in a pre-defined set of virtual objects of an in-game event. The drop-rate is based at least on the PSL of the target player account and the head-start subset. The drop-rate module 330 sends the drop-rate(s) to a client device associated with a target player account via the client device communication module 350.

In various example embodiments, the drop-rate adjustment module 340 may be a hardware-implemented module that controls, manages and stores information related to updating one or more drop-rates for respective type of virtual objects based at least on the in-game event play performance of the target player account and a remaining duration of the in-game event. The drop-rate adjustment module 340 sends the drop-rate(s) to a client device associated with a target player account via the client device communication module 350.

In various example embodiments, the client device communication module 350 is a hardware-implemented module that controls, manages and stores information related to sending a PSL(s), a head-start subset(s) and a drop-rate(s) to a client device associated with a target player account. The client device communication module 350 also controls, manages and stores information related to receiving a current status of the target player account in the in-game event from a client device associated with a target player account.

The modules 310-350 are configured to communicate with each other (e.g., via a bus, shared memory, or a switch). Any one or more of the modules 310-350 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
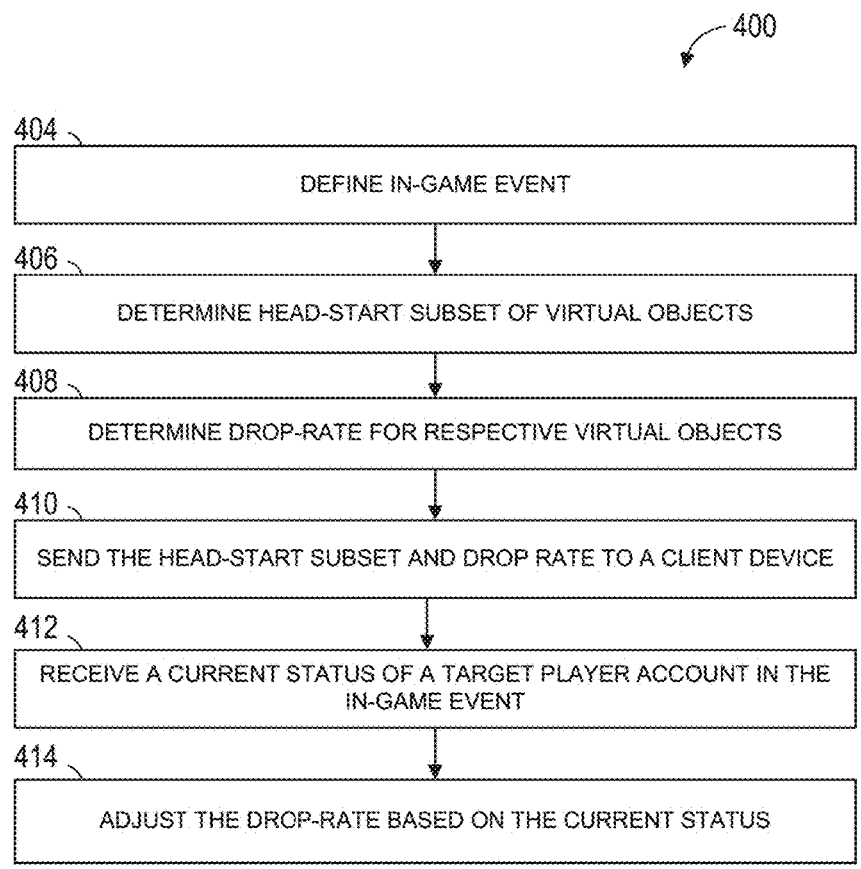
FIG. 4 is a flowchart showing an example method of sending a head-start subset and a drop-rate to a client computing device, according to some example embodiments.

FIG. 4 is a flowchart 400 showing an example method of sending a head-start subset and a drop-rate to a client computing device, according to some example embodiments.

At operation 404, the System Tuner defines an in-game event requiring accumulation of a pre-defined set of virtual objects in a virtual game prior to termination of the in-game event.

In one embodiment, the in-game event requires the target player account (such as Player 201) to accumulate various virtual objects representative of different types of food and the target player account uses these respective virtual objects as ingredients for preparing composite food objects. For example, in a farming simulation game, the in-game event requires the target player account to grow, harvest and/or acquire pre-defined amounts of virtual objects representative of eggs, flour, milk, butter, sugar, salt and apples. The in-game event further requires the target player account to combine the eggs, flour, milk, butter, sugar, salt and apples to create a specific, required number of apple pies before the termination of the in-game event—each apple pie thereby being a composite virtual object required by the in-game event.

At operation 406, the System Tuner determines a head-start subset from the pre-defined set of virtual objects for a target player account based on a difference between a reference player skill level for the virtual game and a player skill level of the target player account.

In one embodiment, the System Tuner determines a reference rate of progression towards completing the in-game event—with respect to the in-game event's pre-defined termination—based on the reference player account's PSL. That is, the System Tuner predicts how long it will take the reference player account to complete every task required by the in-game event. The System Tuner compares the target player account's PSL with the reference rate of progression based on the reference player's PSL. Based on a discrepancy of the target player account's PSL, the System Tuner determines the target player account will be granted a certain amount of each type of virtual object from the pre-defined set of virtual objects.

Returning to the farming simulation example embodiment requiring creation of apple pie composite objects, the System Tuner determines a certain amount of each of eggs, flour, milk, butter, sugar, salt and apples to be granted to the target player account at the outset of the in-game event. Since the target player account has been granted the head-start subset, the target player account will only need to grow, harvest and/or acquire a remaining amount of eggs, flour, milk, butter, sugar, salt and/or apples of the pre-defined set of virtual objects in order to progress through the in-game event in alignment with the reference rate of progression.

At operation 408, the System Tuner determines, based on the player skill level of the target player account and a pre-defined duration of the in-game event, a drop rate for virtual objects remaining in the pre-defined set of virtual objects.

The drop-rate is based on the PSL of the target player account and the pre-defined set of virtual objects. For example, in the framing simulation embodiment, the System Tuner determines a drop rate at which wheat will grow during the in-game event so that the wheat is available to be harvested by the target player account. In another example, the System Tuner determines a drop rate at which apples will grow during the in-game event so that apples are available to be harvested by the target player account. In some embodiments, such drop rates for the target player account will be faster than a drop rate associated with the reference rate of progression such that the respective types of virtual objects are more frequently available for acquisition by the target player account than what would be required for the reference player account to timely complete the in-game event.

At operation 410, the System Tuner sends the head-start subset and the drop rate to a client device associated with the target player account. The client device executes an instance of the virtual game currently being accessed and played by the target player account. The client device incorporates the head-start subset and the drop rate into the instance of the virtual game upon initiation of the in-game event. The client device continually monitors a current progress of the target player account in the in-game event. The client device detects one or more occurrences of the target player account acquiring a respective type of virtual object (such as harvesting an apple) that is in the pre-defined set of virtual objects for the in-game event. The client device sends a current status of the target player account with respect to the target player's progress towards completion of the in-game event to the System Tuner.

At operation 412, the System Tuner receives the current status of the target player account. For example, the System Tuner receives an indication of how many respective virtual objects in the pre-defined set of virtual objects have been acquired by the target player account and how many composite objects the target player account has created. In addition, the System Tuner receives a remaining duration until a termination of the in-game event.

At operation 414, the System Tuner adjusts the drop-rate based at least on a total number of respective virtual objects in the pre-defined set of virtual objects acquired by the target player account, the head-start subset and a remaining duration until the termination of the in-game event.

The System Tuner compares the current status of the target player account with the reference rate of progression. The System Tuner determines that the target player account is not in alignment with the reference rate of progression despite having been granted the head-start subset when the in-game event began. In response, the System Tuner increases the drop-rate of one or more types of the virtual objects such that appearance of each respective type of virtual object during the in-game event is more frequent than as initially calibrated. For example, the System Tuner increases the drop-rate of the wheat such that it wheat grows faster than the initial drop-rate calculated for wheat. In another example, the System Tuner increases the drop-rate of apples such that it apples grow faster than the initial drop-rate calculated for apples. In one embodiment, the System Tuner detects that the current status of the target player account indicates that the target player is significantly behind the reference rate of progression with respect to acquiring a particular virtual object (such as butter). The System Tuner increases the drop-rate of butter such that a churning time required to produce butter is increased in proportion to how far behind the target player account is from the reference rate of progression. The System Tuner sends an updated drop-rate(s) to the client device.

Figure 5:
FIG. 5 is a block diagram illustrating an example user interface displaying a current status of a target player account in an in-game event, according to some example embodiments.

FIG. 5 is a block diagram illustrating an example user interface 500 displaying a current status of a target player account in an in-game event, according to some example embodiments.

In various embodiments, the in-game event requires the target player account (such as Player 201) to accumulate various types of food virtual objects and mix them into respective groupings in order to be canned (i.e. crafted to together to form composite canned virtual objects). The user interface 500 provides an indication of how much time is left 505 for the target player to accumulate the pre-defined set of virtual objects and complete all required tasks in order to qualify to receive the entire reward 545 of the in-game event.

The in-game event requires the target player account to accumulate peach virtual objects and blueberry virtual objects and mix them together in a first composite type 510 to be canned together. The in-game event also requires the target player account to accumulate green bean virtual objects in a second composite type 520 to be canned together. The in-game event requires the target player account to accumulate apple virtual objects and strawberry virtual objects and mix them together in a third composite type 530 to be canned together.

The current status of the target player account provides a first tally 515 that indicates the target player account has not accumulated enough peach virtual objects and blueberry virtual objects to produce three cans for the first composite type 515. A second tally 525 indicates the target player account has not accumulated enough green bean virtual objects to produce three cans for the second composite type 525. A third tally 535 indicates the target player account has not accumulated enough apple virtual objects and strawberry virtual objects to produce four cans for the third composite type 535. Production of three cans of the first composite type 515, eight cans of the second composite type 525 and four cans of the third composite type 535 triggers the System Tuner to award a portion 540 of the total reward 545 of the in-game event.

Based on a current amount of each type of virtual object (i.e. peach, blueberry, green bean, apple, strawberry) that the target player account has accumulated as indicated in the current status presented in the user interface 500, the System Tuner modifies a drop rate of one or more types of virtual objects. For example, the System Tuner decreases an amount of time required for the target player account to grow and harvest a green bean virtual object. For example, the System Tuner decreases an amount of time required for the target player account to grow and harvest an apple virtual object. In another example, the System Tuner increases a frequency at which it rains, thereby speeding up the growth of each type of virtual object (i.e. peach, blueberry, green bean, apple, strawberry) that is required for the in-game event.

Data Flow

Figure 6:
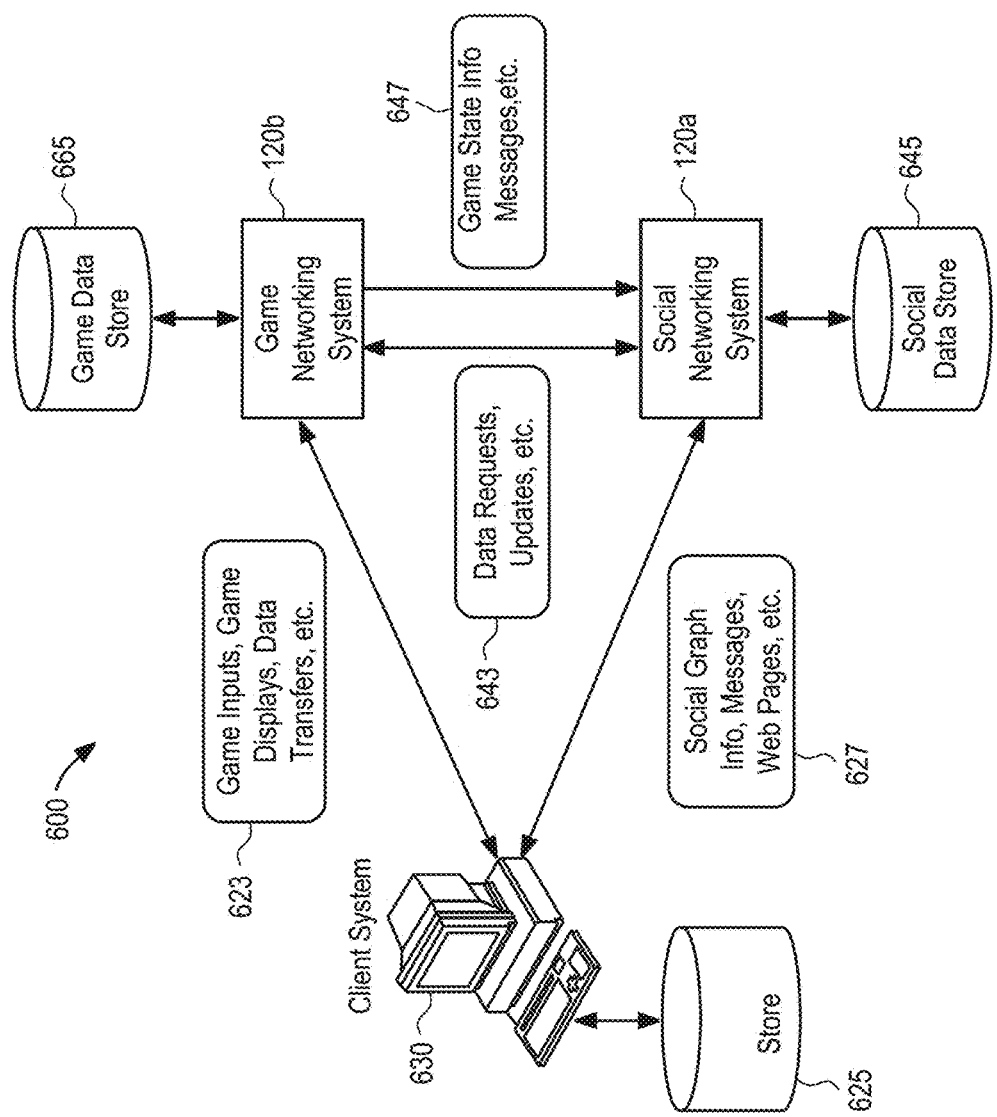
FIG. 6 is a diagrammatic representation of an example data flow between example components of the example system of FIG. 1, according to some example embodiments.

FIG. 6 illustrates an example data flow between the components of system 600. In particular embodiments, system 600 can include client system 630, social networking system 120a (i.e. social network system), and game networking system 120b (i.e. online game system system). The components of system 600 can be connected to each other in any suitable configuration, using any suitable type of connection. The components may be connected directly or over any suitable network. Client system 630, social networking system 120a, and game networking system 120bb can each have one or more corresponding data stores such as local data store 635, social data store 645, and game data store 665, respectively. Social networking system 120a and game networking system 120b can also have one or more servers that can communicate with client system 630 over an appropriate network. Social networking system 120a and game networking system 120b can have, for example, one or more internet servers for communicating with client system 630 via the Internet. Similarly, social networking system 120a and game networking system 120b can have one or more mobile servers for communicating with client system 630 via a mobile network (e.g., GSM, PCS, Wi-Fi, WPAN, etc.). In some embodiments, one server may be able to communicate with client system 630 over both the Internet and a mobile network. In other embodiments, separate servers can be used.

Client system 630 can receive and transmit data 623 to and from game networking system 120b. This data can include, for example, webpages, messages, game inputs, game displays, HTTP packets, data requests, transaction information, updates, and other suitable data. At some other time, or at the same time, game networking system 120b can communicate data 643, 647 (e.g., game state information, game system account information, page info, messages, data requests, updates, etc.) with other networking systems, such as social networking system 120a (e.g., Facebook, Myspace, etc.). Client system 630 can also receive and transmit data 627 to and from social networking system 120a. This data can include, for example, webpages, messages, social graph information, social network displays, HTTP packets, data requests, transaction information, updates, and other suitable data.

Communication between client system 630, social networking system 120a, and game networking system 120b can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 630. At any given time, there may be multiple players at multiple client systems 630 all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 120b for further processing. In addition, multiple client systems 630 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 120a or game networking system 120b), where an instance of the online game is executed remotely on a client system 630, which then transmits application event data to the hosting system such that the remote game server synchronizes game state associated with the instance executed by the client system 630.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 120a or game networking system 120b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 630 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 630. In particular embodiments, the batch file may be a text file and the name-value pairs may be in string format.

In particular embodiments, when a player plays an online game on client system 630, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
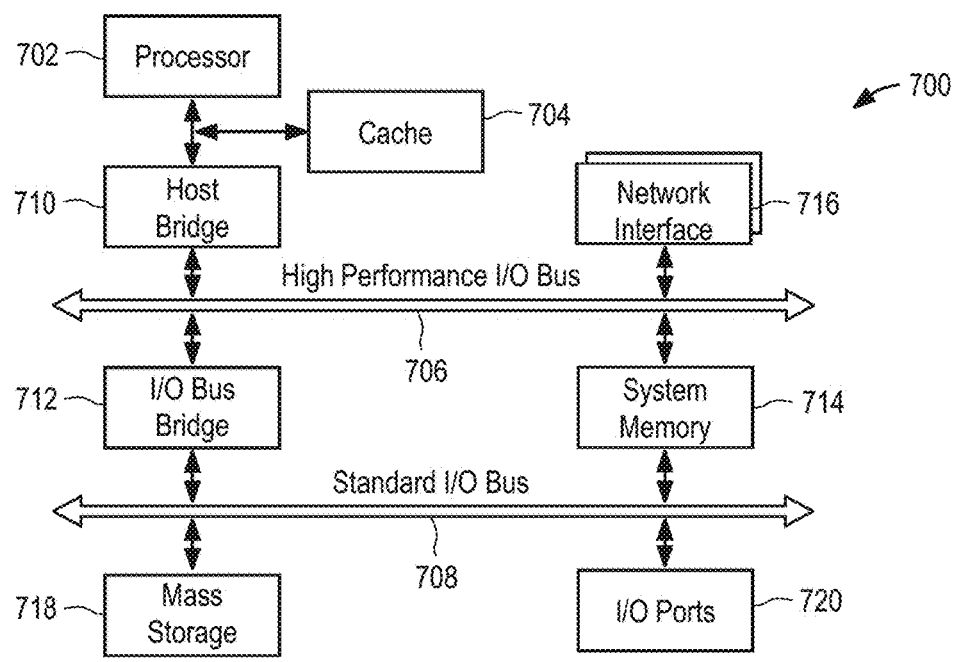
FIG. 7 illustrates an example computing system architecture, which may be used to implement a server or a client system illustrated in FIG. 6, according to some example embodiments.
Figure 8:
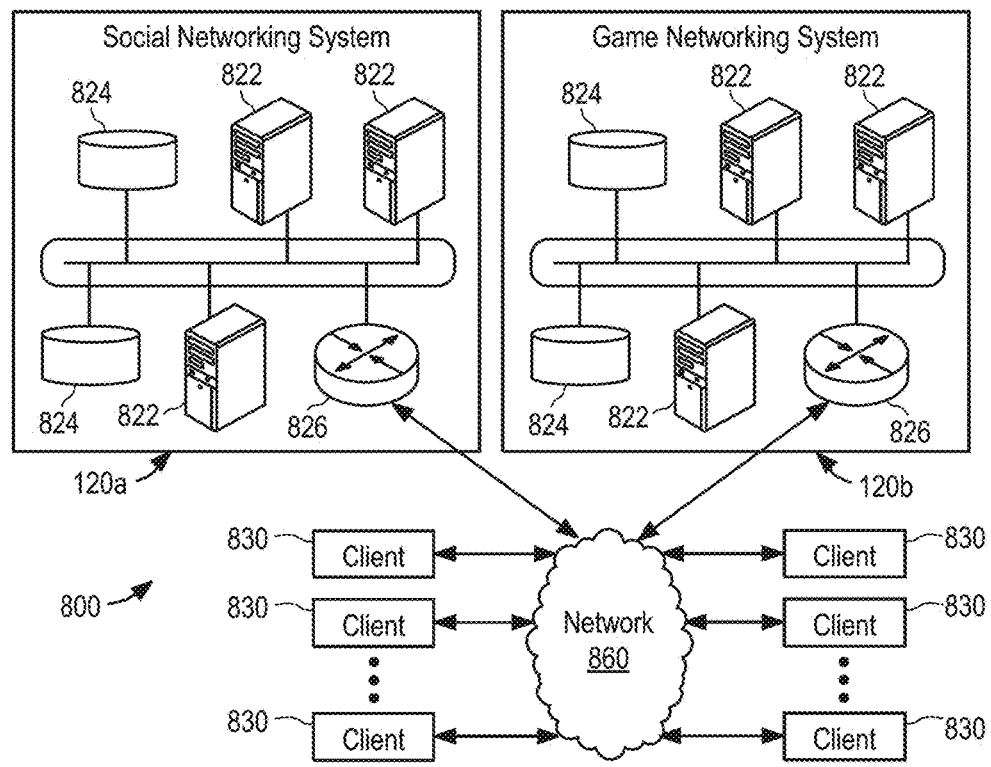
FIG. 8 illustrates an example network environment, in which various example embodiments may operate.

FIG. 7 illustrates an example computing system architecture, which may be used to implement a server 822 or a client system 830 illustrated in FIG. 8. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 1022, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 8 illustrates an example network environment, in which various example embodiments may operate. Network cloud 860 generally represents one or more interconnected networks, over which the systems and hosts described herein can communicate. Network cloud 860 may include packet-based wide area networks (such as the Internet), private networks, wireless networks, satellite networks, cellular networks, paging networks, and the like. As FIG. 8 illustrates, particular embodiments may operate in a network environment comprising one or more networking systems, such as social networking system 120a, game networking system 120b, and one or more client systems 830. The components of social networking system 120a and game networking system 120b operate analogously; as such, hereinafter they may be referred to simply at networking system 820. Client systems 830 are operably connected to the network environment via a network service provider, a wireless carrier, or any other suitable means.

Networking system 120 is a network addressable system that, in various example embodiments, comprises one or more physical servers 822 and data stores 824. The one or more physical servers 822 are operably connected to computer network 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 822 may host functionality directed to the operations of networking system 820. Hereinafter servers 822 may be referred to as server 822, although server 822 may include numerous servers hosting, for example, networking system 820, as well as other content distribution servers, data stores, and databases. Data store 824 may store content and data relating to, and enabling, operation of networking system 820 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In particular embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

Client system 830 is generally a computer or computing device including functionality for communicating (e.g., remotely) over a computer network. Client system 830 may be a desktop computer, laptop computer, personal digital assistant (PDA), in- or out-of-car navigation system, smart phone or other cellular or mobile phone, or mobile gaming device, among other suitable computing devices. Client system 830 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 830 to enter addresses of specific network resources to be retrieved, such as resources hosted by networking system 820. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 830 desires to view a particular webpage (hereinafter also referred to as target structured document) hosted by networking system 820, the user's web browser, or other document Sequence Generator or suitable client application, formulates and transmits a request to networking system 820. The request generally includes a URL or other document identifier as well as metadata or other information. By way of example, the request may include information identifying the user, such as a user ID, as well as information identifying or characterizing the web browser or operating system running on the user's client computing device 830. The request may also include location information identifying a geographic location of the user's client system or a logical network location of the user's client system. The request may also include a timestamp identifying when the request was transmitted.

Although the example network environment described above and illustrated in FIG. 8 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer system comprising:
   a processor;
   a memory device holding an instruction set executable on the processor to cause the computer system to perform operations comprising:
      defining an in-game event requiring accumulation of a pre-defined set of virtual object types by a target player account in a virtual game, the set of virtual object types having respective drop rates, each drop rate indicating a rate at which objects of the corresponding type become available for accumulation during the in-game event;
      causing presentation on a client device associated with the target player account of the virtual in-game event, each virtual object type in the set becoming available at the corresponding drop rate;
      during the in-game event, determining one or more player-specific accumulation parameters based at least in part on a comparison between a reference gameplay metric and a corresponding gameplay metric for the target player account in the virtual game, the one or more player-specific accumulation parameters including a respective modified drop rate for one or more of the object types in the set, each modified drop rate being different from the drop rate previously employed in the in-game event for the corresponding virtual object type; and
      thereafter, causing presentation on the client device of the virtual in-game event in accordance with the one or more player-specific accumulation parameters, the one or more virtual object types becoming available for accumulation at the respective modified drop rate.

2. The computer system of claim 1, wherein the pre-defined set of virtual objects comprises a respective target number of objects for each of the different object types in the set.

3. The computer system of claim 1, wherein the gameplay metric comprises a skill level associated with the target player account.

4. The computer system of claim 1, wherein determining the respective drop rates for the one or more types of virtual object comprises:
   determining a frequency dining the in-game event at which each respective type of virtual object remaining to be accumulated in the pre-defined set of virtual objects becomes available in the virtual game for acquisition by the target player account.

5. The computer system of claim 4, further comprising:
   receiving, from the client device, an indication of acquisition by the target player account of at least one virtual object whose type is included in the pre-defined set of virtual object types; and
   calculating, at the server computing device, respective modified drop rates for the corresponding one or more types of virtual object based at least on:
      a total number of virtual objects of the respective object type acquired by the target player account; and
      a remaining duration until termination of the in-game event; and
      sending the modified drop-rate the client device associated with the target player account.

6. A non-transitory computer-readable medium storing executable instructions thereon, which, when executed by a processor, cause the processor to perform operations including:
   defining an in-game event requiring accumulation of a pre-defined set of virtual object types by a target player account in a virtual game, the set of virtual object types having respective drop rates, each drop rate indicating a rate at which objects of the corresponding type become available for accumulation during the in-game event;
   causing presentation on a client device associated with the target player account of the virtual in-game event, each virtual object type in the set becoming available at the corresponding drop rate;
   during the in-game event, determining one or more player-specific accumulation parameters based at least in part on a comparison between a reference gameplay metric and a corresponding gameplay metric for the target player account in the virtual game, the one or more player-specific accumulation parameters including a respective modified drop rate for one or more of the object types in the set, each modified drop rate being different from the drop rate previously employed in the in-game event for the corresponding virtual object type; and
   thereafter, causing presentation on the client device of the virtual in-game event in accordance with the one or more player-specific accumulation parameters, the one or more virtual object types becoming available for accumulation at the respective modified drop rate.

7. The non-transitory computer-readable medium of claim 6, wherein the pre-defined set of virtual objects comprises a respective target number of objects for each of the different object types in the set.

8. The non-transitory computer-readable medium of claim 6, wherein the gameplay metric comprises a skill level associated with the target player account.

9. The non-transitory computer-readable medium of claim 6, wherein determining the respective drop rates for the one or more types of virtual object comprises:
   determining a frequency during the in-game event at which each respective type of virtual object remaining to be accumulated in the pre-defined set of virtual objects becomes available in the virtual game for acquisition by the target player account;
   receiving, from the client device, an indication of acquisition by the target player account of at least one virtual object whose type is included in the pre-defined set of virtual object types; and
   calculating, at the server computing device, respective modified drop rates for the corresponding one or more types of virtual object based at least on:
      a total number of virtual objects of the respective object type acquired by the target player account; and
      a remaining duration until termination of the in-game event; and
      sending the modified drop-rate to the client device associated with the target player account.

10. A computer-implemented method, comprising:
   defining an in-game event requiring accumulation of a pre-defined set of virtual object types by a target player account in a virtual game, the set of virtual object types having respective drop rates, each drop rate indicating a rate at which objects of the corresponding type become available for accumulation during the in-game event;

causing presentation on a client device associated with the target player account of the virtual in-game event, each virtual object type in the set becoming available at the corresponding drop rate;

during the in-game event, determining one or more player-specific accumulation parameters based at least in part on a comparison between a reference gameplay metric and a corresponding gameplay metric for the target player account in the virtual game, the one or more player-specific accumulation parameters including a respective modified drop rate for one or more of the object types in the set, each modified drop rate being different from the drop rate previously employed in the in-game event for the corresponding virtual object type; and thereafter, causing presentation on the client device of the virtual in-game event in accordance with the one or more player-specific accumulation parameters, the one or more virtual object types becoming available for accumulation at the respective modified drop rate.

* * * * *

UNITED STATES PATENT AND TRADEMARK OFFICE
CERTIFICATE OF CORRECTION

| | | |
|---|---|---|
| PATENT NO. | : 10,456,686 B2 | Page 1 of 1 |
| APPLICATION NO. | : 14/849354 | |
| DATED | : October 29, 2019 | |
| INVENTOR(S) | : Patton et al. | |

It is certified that error appears in the above-identified patent and that said Letters Patent is hereby corrected as shown below:

In the Drawings

On sheet 6 of 8, Fig. 6, reference numeral 625, Line 1, delete "Store" and insert --Local Data Store-- therefor In the Specification In Column 17, Line 21, delete "120bb" and insert --120b-- therefor In Column 17, Line 23, delete "635," and insert --625,-- therefor In Column 21, Line 38, delete "1022," and insert --822,-- therefor In the Claims In Column 25, Line 51, in Claim 4, delete "dining" and insert --during-- therefor In Column 26, Line 1, in Claim 5, after "drop-rate", insert --to--

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*